(12) United States Patent
Dinel

(10) Patent No.: US 6,517,600 B1
(45) Date of Patent: Feb. 11, 2003

(54) PURE ORGANIC FERTILIZER

(76) Inventor: Henri Dinel, 104 Chemin Juniper, Chelsea, Quebec (CA), J0X 1N0

(*) Notice: Subject to any disclaimer, the term of this patent is extended or adjusted under 35 U.S.C. 154(b) by 0 days.

(21) Appl. No.: 09/692,835

(22) Filed: Oct. 20, 2000

Related U.S. Application Data

(63) Continuation-in-part of application No. 09/344,537, filed on Jun. 25, 1999, now abandoned.

(30) Foreign Application Priority Data

Jun. 27, 2000 (CA) .............................. PCT/CA00/00765

(51) Int. Cl.⁷ .............................. C05F 3/00; C05F 17/00
(52) U.S. Cl. .............................. 71/21; 71/24; 71/64.05; 71/903
(58) Field of Search ................................ 71/11, 15, 21, 71/23, 24, 34, 64.03, 64.05, 903; 23/313 R

(56) References Cited

U.S. PATENT DOCUMENTS 3,050,383 A * 8/1962 Wilson ........................ 71/11
5,337,496 A    8/1994 Glorioso

FOREIGN PATENT DOCUMENTS

| AU | 8812359 A | * | 9/1987 | ............. C05F/3/00 |
| DE | 197 50 951 | | 6/1999 | |
| EP | 0 123 570 | | 10/1984 | |
| EP | 0 759 323 | | 2/1997 | |
| FR | 2 279 458 | | 2/1976 | |
| GB | 1485236 A | * | 9/1977 | ........... C05F/13/00 |

* cited by examiner

Primary Examiner—Steven P. Griffin
Assistant Examiner—Maribel Medina
(74) Attorney, Agent, or Firm—Robert A. Wilkes

(57) ABSTRACT

A process for converting composted organic material produced by optimized composting procedures into pure organic fertilizer for agronomic and other uses, particularly the expanding organic food market. It is essential that only organic wastes that are compatible with being certified organic are used for the composting step. In the first step, the raw organic matter is processed into compost by optimized standard methods, and is screened to remove all particles approximately 1 cm in size or greater. This coarse material is recycled back into the composting process. In the second step, the material below 1 cm is further screened to separate out the compost fine particles of 1 mm or less. A major proportion of the particles should be below 150 microns. The particles between 1 mm and 1 cm are rejected, and may be used for other purposes. In the third step, the compost fine particles are pelleted at a pressure between 2,000 and 6,000 psi to form a pure organic fertilizer pellet of an appropriate density so that the nutrients will be released into a soil medium, or plant substrate, at a rate required for optimum plant growth. The compression process binds the fine particles together, and assists in the timed release of the nutrients from the pure organic fertilizer pellet. The pure organic fertilizer pellets can be applied to organic farm fields, market gardens, and the like, in the normal way.

4 Claims, No Drawings

PURE ORGANIC FERTILIZER

This is a continuation-in-part of application Ser. No. 09/344,537, filed Jun. 25, 1999, abandoned.

FIELD OF THE INVENTION

This invention relates to an enhanced pure organic fertilizer, and to a process for converting composted organic material produced by optimized composting procedures into enhanced organic fertilizer for agronomic and other uses.

BACKGROUND OF THE INVENTION

The successful production of plants, including crops, flowers, young tree saplings and the like, involves optimizing the soil fertility in order to produce growth and maturity. It is also desirable to maintain soil fertility and structure over long periods of time. Animal manures have been used as nutrient sources since ancient times; the use of animal manures also provides good soil tilth and structure. The disadvantage, however, is animal manures have relatively low nutrient value, include non-stabilized forms of plant nutrients prone to leaching and, if the manure is applied raw, the soil will have to provide nutrients for the microorganisms involved in the manure breakdown process. This can lead to a nutrient deficiency in the soil for a crop planted in it.

Soil fertility involves a complex series of interactions of the numerous components in the soil, including physical, chemical, and hydrological processes and phenomena. Attaining agronomic benefit from the application of compost based fertilizers to croplands requires a compost product that interacts beneficially with all of the physical, chemical and biological processes and phenomena going on in the soil. The factors influencing soil fertility include soil pH, the form of the available resident nutrients, temperature, moisture content, soil atmosphere and the microbial populations that are present. The incorporation of compost into soil can influence all of these factors. The indiscriminate addition of low quality compost to croplands can be counter productive, and can result in soil fertility problems.

The majority of fertilizers applied to croplands in North America for crop production are chemical or mineral fertilizers, or a combination of these. Mineral fertilizers tend to be simple mineral salts of nitrogen, phosphorous and potassium, such as ammonium nitrate, and potassium phosphate. Synthetic chemical fertilizers cannot normally be used in certified organic food production.

Composting is a common process used to recycle organic wastes. The composting process reduces the volume of organic material and stabilizes potential nutrients in the compost, particularly nitrogen. Composting curtails environmental pollution and reduces, often significantly, the amount of recyclable organic matter requiring another method of disposal, which often is to dump it into a landfill site. During the composting process, the carbon and nitrogen containing compounds in the organic materials are transformed by successive microbial populations into more stable complex forms which chemically and biologically resemble humic substances.

The commercial viability of existing composting facilities is primarily based on the operator receiving a fee for accepting the organic material from waste generators. The emphasis in most of these waste management composting facilities is the composting of large volumes of material to reduce the amount of material. The retention time in the composting channels or windrows is minimized to allow the maximum flow through. Sometimes the compost is allowed to cure outside the composting system to complete the bio-stabilization process. Little effort is made to maximize the quality of the compost.

The development of compost fertilizer to minimize the volume of waste organic material going to landfill sites has resulted in substantial quantities of compost becoming available for cropland application. Not all of this compost material is suitable for certified organic farming. This invention seeks to provide a multi-step process in which the quality of organic compost applied to farmland is maximized, so that the organic compost provides as much benefit as can reasonably be achieved to the farmland.

Dick and McCoy, in "Enhancing Soil Fertility by Addition of Compost", 1993 Science and Engineering of Composting, Design, Environmental, Microbial and Utilization Aspects, Renaissance Publications, Ohio, USA, summarize the advantages and disadvantages of compost and mineral fertilizers.

TABLE 1

Comparison of Mineral Salts and Compost

| Material | Advantage | Disadvantage |
| --- | --- | --- |
| Mineral Salt | convenient | leached easily and low efficiency |
|  | lower transpotatopm and handling costs | continuous use may lead to soil structure breakdown and diffuse water pollution |
|  | quick crop response | supplies only major nutrients |
| Compost | improve soil structure | dilute nutrient source |
|  | controls erosion | high transport and handling cost |
|  | supplies wide range of nutrients | may be difficult to apply |
|  | hygienic disposal of pathogenic waste | high C/N ratios may rob soil N |

The scientific literature records numerous positive crop yields from the application of compost as a fertilizer to farmland. Where yield decreases have been reported they can generally be attributed to the application of immature compost where the bio-stabilization process is incomplete. The addition of immature compost to soil can result in soil nitrogen being utilized to complete the bio-stabilization process.

In recent years there has been a continuous growth in developed countries in the production of food crops by certified organic crop production processes. The governments of both Canada and the United States are developing standards for labelling food products as "organically produced", and several certifying agencies exist to certify farms and market gardens as "organic". The concept underpinning "organic" food crop production is the elimination of the synthetic chemical fertilizers, pesticides, drugs, growth hormones and other non-natural production means commonly used. The following agencies provide certification that the required standards are met:

OCI—Organic Crop Improvement Association 1001 Y Street, Suite B Lincoln, Nebr. 68508-1172 U.S.A.; and QAI—Quality Assurance International 12526 High Bluff Dr., Suite 300 San Diego, Calif. 92130 U.S.A.

BRIEF DESCRIPTION OF THE INVENTION

This invention seeks to overcome the problems that exist with the use of poor quality compost as a fertilizer on soils, such as farmland used for a crop. In particular, this invention seeks to provide pure organic fertilizer pellets that can be used to provide food products, particularly fruit and vegetable products, that comply with the requirements for "organic products", and thus can be so certified.

DETAILED DESCRIPTION OF THE INVENTION

Thus, in its broadest embodiment, this invention seeks to provide a process for preparing pure organic fertilizer pellets from a compostable waste material or materials complying with organic standards comprising:

(i) converting the waste material into a fine particulate mass of fully bio-stabilized compost with known levels of nitrogen, phosphorous, potassium and water under conditions which minimize losses of nutrients due to volatilization and leaching;

(ii) passing the fully bio-stabilized and nutrient rich compost through a relatively coarse screen to provide two fractions, comprising small particle material less than 1 cm and particles greater than 1 cm, and separating the particles greater than 1 cm for further processing;

(iii) passing the small particle material from step (ii) through a second screen, to provide a fine particle material having a diameter of 1 mm or less, in which a major proportion of the fine particles are less than 150 microns in size;

(iv) mixing the fine particle material from step (iii) under controlled conditions with an agronomically acceptable source of nutrients to enhance the compost fertilizer to a desired agronomic level to provide a blended mixture having a known nitrogen:phosphorus:potassium ratio; and (v) subjecting the blended mixture from step (iv) to a pelleting process at a pressure of from about 2,000 psi to about 6,000 psi to provide a pelleted pure organic fertilizer product meeting applicable organic standards.

In the process of this invention, the first step is to convert the incoming waste material into compost. The organic waste material that is composted is restricted to materials that are derived from natural sources, and complies with "organic" standards. A typical feed material would be plant wastes from the harvesting of organically grown crops. Similarly, livestock wastes from organically raised livestock can be composted separately or in combination with other clean organic wastes. In this step, the bio-stabilization composting process is optimized as far as it is possible, and it is completed under controlled conditions, so as to produce fully bio-stabilized composts with known levels of nitrogen, phosphorous and potassium. The amount of nitrogen, phosphorous and potassium in the compost can be influenced by the selection and control of the raw organic matter to be composted. For example, the waste material is chosen so as to provide a final product having an optimized nitrogen:phosphorus:potassium ratio. The nitrogen:phosphorous:potassium ratio can range between 1 and 15% by volume in the final pellet depending upon the source of the raw organic material.

Complete bio-stabilization in itself is not a new process. In the process of this invention, the bio-stabilization process is fully completed during the composting process. The retention time in the composting process is thus at least sufficient to allow for complete bio-stabilization. In addition, in the process of this invention, steps are taken to minimize losses of nutrients due to volatilization and leaching. It is also necessary to control the water content of the incoming waste material, to ensure that the composted material has the desired water content, and is obtained as a screenable dry particulate material.

In the second step of the process of this invention, the fully bio-stabilized and nutrient rich compost is passed through a relatively coarse screen, and separated into two fractions. The particles greater than 1 cm are removed and further processed, and the smaller particles are used in the next step.

In the third step of this invention, the material from step two is screened a second time, so as to separate it into specific particle size components. The compost is screened for particles of 1 mm or less, to provide a material in which preferably at least about 95% of the fine particles are less than 150 microns in size. This is referred to as the "fine" component of the finished compost. The larger particles, above 200 microns, are rejected, and are used for other purposes.

In the fourth step of the process of this invention, the screened fine material obtained in the third step is subjected to a pelleting process in a pelleting mill, or similar equipment, to provide a pelleted pure organic fertilizer product. In the pelleting mill, the organic matter in the compost fine material binds the fine particles together into a pure organic fertilizer pellet during compression in the pelleting mill. Depending to some extent on the size and shape of the pellets being produced, typical pelleting pressures are in the range of from 2,000 psi to 6,000 psi. The use of pressures beyond 6,000 psi do not provide any benefits, as optimal bonding appears to be obtained with a pressure between 2,000 and 6,000 psi.

The thus obtained pure organic fertilizer pellets are then packaged by conventional methods for use. The fertilizer compost pellets can be sold into the commercial fertilizer market, particularly for the use of practitioners of organic crop production.

EXAMPLE

Stabilised compost was sieved to obtain a fine fraction of less than 200 gm. This fine fraction was pelletised at a pressure between 2,000 psi and 4,000 psi using a Carver press. The press was used with a 12 slot die, and was operated at 20,000 psi to overcome friction and material resistance, so as to obtain pressures in the range of 2,000 to 4,000 psi in each of the die slots.

Lettuce was grown in a substrate made from a mixture of sandy soil and black earth. The plants were split into two groups. The organic fertilizer pellets were applied at the recommended rate for lettuce to one group, and chemical fertiliser was applied to the other group, again at the recommended rate. The total plant dry yield was 22% higher for the first group fertilised with the organic pellets, than for the second group fertilised with a conventional chemical fertiliser. The shoot dry weight for the first group was 28.8% higher, but the root dry weight was slightly lower, again in comparison with the second group to which chemical fertiliser was applied. The lettuce plants grown with the organic fertilizer pellets appeared to be more robust, with a deeper green leaf colour than those grown with the conventional chemical fertiliser.

In the pure organic fertilizer pellets made by the process of this invention the humified organic components derived from the original composted organic materials assists in soil structure improvement. Minor nutrients may also be available from the compost fine material, depending on the source of raw material. The use of pelleted pure organic fertilizer provides a high bulk density pure organic fertilizer that minimizes trucking and application costs.

The fertilizer products of this invention show the advantages of compost fertilizers as described above, and minimize the disadvantages. The compression of the compost fine material into a pellet form minimizes premature leaching of the nutrients into the soil, and maximizes the plant nutrient uptake as the natural nutrients are bio-modulated to best match the plant growth curve.

What is claimed is:

1. A process for preparing pure organic fertilizer pellets from a compostable waste material or materials complying with organic standards comprising:

(i) converting the waste material by composting into a fine particulate mass of fully bio-stabilized compost with known levels of nitrogen, phosphorous, potassium and water under conditions which minimize losses of nutrients due to volatilization and leaching;

(ii) passing the fully bio-stabilized and nutrient rich compost through a relatively coarse screen to provide two fractions, comprising small particle material less than 1 cm and particles greater than 1 cm, and separating the particles greater than 1 cm;

(iii) passing the small particle material from step (ii) through a second screen, to provide a fine particle material having a diameter of 1 mm or less, in which a major proportion of the fine particles are less than 150 microns in size;

(iv) mixing the fine particle material from step (iii) with an agronomically acceptable source of nutrients to enhance the compost fertilizer to a desired agronomic level to provide a blended mixture having a known nitrogen:phosphorus:potassium ratio; and (v) subjecting the blended mixture from step (iv) to a pelleting process at a pressure of from about 2,000 psi to about 6,000 psi to provide a pelleted pure organic fertilizer product meeting applicable organic standards.

2. A process according to claim 1 wherein in step (iii) approximately 95% of the fine particles have a size of 150 microns or less.

3. A process according to claim 1 wherein step (i) is controlled to provide a compost fine material in step (iii) having an optimized nitrogen:phosphorus:potassium ratio.

4. A process according to claim 3 wherein the nitrogen:phosphorous:potassium ratio is in the range of 1–15: 1–15: 1–15.

* * * * *